(12) United States Patent
Tötterman et al.

(10) Patent No.: US 8,513,928 B2
(45) Date of Patent: Aug. 20, 2013

(54) BIDIRECTIONAL BUCK-BOOST CONVERTER

(75) Inventors: Eric Mikael Tötterman, Tähtelä (FI);
Esa Kai Paatero, Helsinki (FI)

(73) Assignee: Eaton Corporation, Cleveland, OH (US)

( * ) Notice: Subject to any disclaimer, the term of this patent is extended or adjusted under 35 U.S.C. 154(b) by 462 days.

(21) Appl. No.: 12/985,109

(22) Filed: Jan. 5, 2011

(65) Prior Publication Data
US 2012/0169126 A1  Jul. 5, 2012

(51) Int. Cl.
*G05F 1/40* (2006.01)

(52) U.S. Cl.
USPC .............. 323/271; 323/282; 323/288; 307/69

(58) Field of Classification Search
USPC .................. 323/225, 239, 271, 282, 288, 351; 307/69
See application file for complete search history.

(56) References Cited

U.S. PATENT DOCUMENTS

| | | | |
|---|---|---|---|
| 4,053,722 A | 10/1977 | Nahay | |
| 5,473,528 A | 12/1995 | Hirata et al. | |
| 5,734,258 A | 3/1998 | Esser | |
| 6,069,412 A | 5/2000 | Raddi et al. | |
| 6,700,802 B2 | 3/2004 | Ulinski et al. | |
| 6,788,033 B2 | 9/2004 | Vinciarelli | |
| 6,850,425 B2 | 2/2005 | Tan et al. | |
| 6,944,035 B2 | 9/2005 | Raddi et al. | |
| 6,977,488 B1 | 12/2005 | Nogawa et al. | |
| 7,082,040 B2 | 7/2006 | Raddi et al. | |
| 7,116,085 B2 | 10/2006 | Ikezawa | |
| 7,145,266 B2 | 12/2006 | Lynch et al. | |
| 7,154,250 B2 | 12/2006 | Vinciarelli | |
| 7,157,890 B1 | 1/2007 | Kris | |
| 7,259,477 B2 | 8/2007 | Klikic et al. | |
| 7,402,921 B2 | 7/2008 | Ingemi et al. | |
| 7,408,794 B2 * | 8/2008 | Su ..................... | 363/98 |
| 7,420,826 B2 | 9/2008 | Tan et al. | |
| 7,521,823 B2 | 4/2009 | Klikic et al. | |
| 7,652,393 B2 | 1/2010 | Moth | |
| 7,688,048 B2 | 3/2010 | Nielsen | |
| 7,812,575 B2 * | 10/2010 | Shimada et al. ............ | 323/222 |
| 8,098,056 B2 * | 1/2012 | Yamazaki et al. .......... | 323/222 |
| 2009/0237042 A1 * | 9/2009 | Glovinski .................. | 323/235 |
| 2009/0314179 A1 | 12/2009 | Kumar | |
| 2010/0054002 A1 | 3/2010 | Lu et al. | |
| 2010/0164446 A1 | 7/2010 | Matsuo et al. | |

OTHER PUBLICATIONS

Jalbrzykowski and Citko; "A Bidirectional DC-DC Converter for Renewable Energy Systems", Bulletin of the Polish Academy of Sciences, Technical Sciences, vol. 57 No. 4 (2009).

* cited by examiner

*Primary Examiner* — Jessica Han
(74) *Attorney, Agent, or Firm* — Edward Gecovich; Benesch, Friedlander Coplan & Aronoff LLP

(57) ABSTRACT

A bidirectional buck-boost DC-DC converter is particularly well suited for applications where multiple bidirectional buck-boost DC-DC converters are connected in parallel to a common battery. Multiple bidirectional DC-DC converters, as disclosed, may be connected in parallel to a common battery and, at least in boost mode, substantially no current circulates between the parallel connected bidirectional DC-DC converters.

25 Claims, 6 Drawing Sheets

US 8,513,928 B2

BIDIRECTIONAL BUCK-BOOST CONVERTER

FIELD OF THE INVENTION

The present disclosure relates generally to a bidirectional buck-boost DC-DC converter. In particular, the present disclosure relates to a bidirectional buck-boost DC-DC converter well suited for applications where multiple bidirectional buck-boost DC-DC converters are connected in parallel to a common battery.

BACKGROUND

FIG. 1 illustrates a block diagram of an exemplary prior art uninterruptable power supply (UPS) 100. The UPS 100 includes an AC-DC rectifier 110 which converts AC line voltage 105 to DC 115. DC 115 is relatively high voltage. The UPS 100 further includes a DC-AC inverter 120 which converts the DC 115 to the AC output 125. The UPS 100 further includes a bidirectional DC-DC converter 130 and a battery 140.

When the AC line voltage 105 is normal, the bidirectional DC-DC converter 130 operates in buck mode, meaning that it reduces (bucks) the relatively high voltage DC 115 down to the lower voltage DC 135. The bidirectional DC-DC converter 130 outputs DC 135, which charges the battery 140. The voltage of DC 135 is chosen based on the battery 140.

When the AC line voltage 105 fails, the bidirectional DC-DC converter 130 operates in boost mode, meaning that it increases (boosts) the relatively lower voltage DC 135 up to the higher voltage DC 115. The battery 140 feeds the bidirectional DC-DC converter 130 that, in turn, feeds the DC-AC inverter 120, which feeds the load.

In some applications, deploying multiple UPS sharing a common battery may be desirable. In such applications, two or more bidirectional DC-DC converters, such as converter 130, would be connected in parallel to one battery or one battery string that is common to the multiple UPS.

FIG. 2 illustrates a schematic of an exemplary prior art bidirectional DC-DC converter 200.

The converter 200 includes a first set of capacitors C1 and C2 connected to a positive rail and a negative rail, respectively, of a DC Link. The converter 200 further includes buck switches Q1 and Q2, boost switches Q3 and Q4 and diodes D1, D2, D3, and D4. The buck switches Q1 and Q2 switch on and off periodically in buck mode and remain off in boost mode. The boost switches Q3 and Q4 switch on and off periodically in boost mode and remain off in buck mode. The converter 200 also includes inductors L1 and L2, and current sensors CS1 and CS2. The converter 200 also includes a second set of capacitors C3 and C4 connected to the battery BAT.

The converter 200 may be connected in parallel with other bidirectional DC-DC converters (not shown) to a common battery BAT. The converter 200 is shown connected to the battery BAT through three terminals, +BAT, −BAT, and mid-BAT. In this configuration, the battery BAT must have a midpoint connection point midBAT, which may be a disadvantage because it adds additional connections and cabling. The converter 200 may also be connected (not shown) to the battery BAT through only two terminals +BAT and −BAT with no midpoint connection. However, this configuration has disadvantages relating to voltage centering of the DC Link relative to the common battery BAT and circulating current between parallel connected converters connected to the common battery BAT. Additional control circuitry for active centering or active balancing is usually needed to mitigate these disadvantages with prior art converters. The additional circuitry adds cost and complexity.

SUMMARY

A bidirectional buck-boost converter includes a first set of capacitors and a second set of capacitors having positive, negative, and mid terminals. The positive and negative terminals of the first set of capacitors are configured to operably connect to positive and negative rails, respectively, of a first source. The positive and negative terminals of the second set of capacitors are configured to operably connect to positive and negative terminals, respectively, of a second source. The mid terminal of the first set of capacitors is operably connected to the mid terminal of the second set of capacitors.

The bidirectional buck-boost converter further includes a set of buck switching elements including a first buck switching element and a second buck switching element. The set of buck switching elements is configured to switch on and off periodically in buck mode and to remain off in boost mode. The first buck switching element is operably connected to the positive terminal of the first set of capacitors and the second buck switching element is operably connected to the negative terminal of the first set of capacitors.

The bidirectional buck-boost converter may further include a set of inductors including a first inductor and a second inductor. The first inductor has one terminal operably connected to the positive terminal of the second set of capacitors and another terminal operably connected to the first buck switching element. The second inductor has one terminal operably connected to the negative terminal of the second set of capacitors and another terminal operably connected to the second buck switching element.

The bidirectional buck-boost converter further includes a boost switching element configured to switch on and off periodically in boost mode and to remain off in buck mode. The boost switching element has one terminal operably connected to the first buck switching element and the first inductor and a second terminal operably connected to the second buck switching element and the second inductor.

The bidirectional buck-boost converter further includes a set of unidirectionally conducting elements including first, second, and third unidirectionally conducting elements operably connected in antiparallel to the first buck switching element, the second buck switching element, and the boost switching element, respectively. The unidirectionally conducting elements may be parasitic body diodes, copackaged diodes, discrete diodes, and so on.

The bidirectional buck-boost converter further includes at least one current sensor configured to sense current through at least one of the first inductor and the second inductor. In one embodiment, the at least one current sensor includes a first current sensor connected in series with the first inductor and a second current sensor connected in series with the second inductor.

In one embodiment, the boost switching element comprises a single switching device.

The bidirectional buck-boost converter may further include a control circuit operably connected to the buck switching elements and the boost switching element. The control circuit is configured to transmit signals to the buck switching elements and to the boost switching element. The signals cause the buck switching elements to switch on and off periodically in buck mode and remain off in boost mode.

The signals cause the boost switching element to switch on and off periodically in boost mode and to remain off in buck mode.

In one embodiment, the first source is a DC link of an uninterruptable power supply (UPS) and the second source is a battery that is common to multiple UPS. In this arrangement, multiple bidirectional buck-boost converters as disclosed may be connected in parallel to the common battery. In boost mode, substantially no current circulates between the parallel connected bidirectional buck-boost converters. Thus, at least in boost mode, current does not circulate between the multiple UPS.

In one embodiment, a UPS includes a DC link port operably coupled to a DC link of the UPS, a battery port configured to operably couple to at least one battery, and a DC/DC converter operably coupled to the DC link port and to the battery port. The DC/DC converter transfers power from the DC link port to the battery port in buck mode and from the battery port to the DC link port in boost mode. The DC/DC converter is operable such that in boost mode the DC/DC converter causes a battery voltage across the battery port to be substantially centered between a DC link voltage across the DC link port automatically without active voltage centering. Therefore, no additional voltage centering circuitry is required.

In one embodiment, the DC/DC converter includes a single boost switching element.

In one embodiment, the UPS connects in parallel with at least a second UPS to the at least one battery. At least in boost mode, substantially no current flows between the UPS and the second UPS.

A method for operation of a bidirectional DC/DC converter operably coupled to a DC link and to a battery includes switching from a buck mode of operation where the bidirectional DC/DC converter transfers power from the DC link to the battery to a boost mode of operation where the bidirectional DC/DC converter transfers power from the battery to the DC link. The method further includes operating a single switching element in boost mode such that amplitude of a voltage across the battery is substantially centered between amplitude of a voltage across the DC link.

In one embodiment where at least one additional bidirectional DC/DC converter is operably connected to the battery in parallel with the first bidirectional DC/DC converter, a method for operation of the first bidirectional DC/DC converter includes operating the single switching element such that substantially no current from the bidirectional DC/DC converter flows to the at least one additional bidirectional DC/DC converter.

BRIEF DESCRIPTION OF THE DRAWINGS

The accompanying drawings, which are incorporated in and constitute a part of the specification, illustrate various exemplary systems, methods, and so on, that illustrate various exemplary embodiments of aspects of the invention. A person of ordinary skill in the art will appreciate that the illustrated boundaries of components in the figures represent one example of the boundaries. A person of ordinary skill in the art will also appreciate that one component may be designed as multiple components or that multiple components may be designed as a single component. Additionally, an internal component may be implemented as an external component and vice versa. Further, the figures may be drawn not to scale and the proportions of certain parts may be exaggerated for convenience of illustration.

DETAILED DESCRIPTION

While the disclosed systems and methods are described in the context of a UPS application, and while the disclosed systems and methods may be of particular interest to UPS applications, the disclosed systems and methods may be applicable to any applications requiring a bidirectional buck-boost converter.

Figure 1:
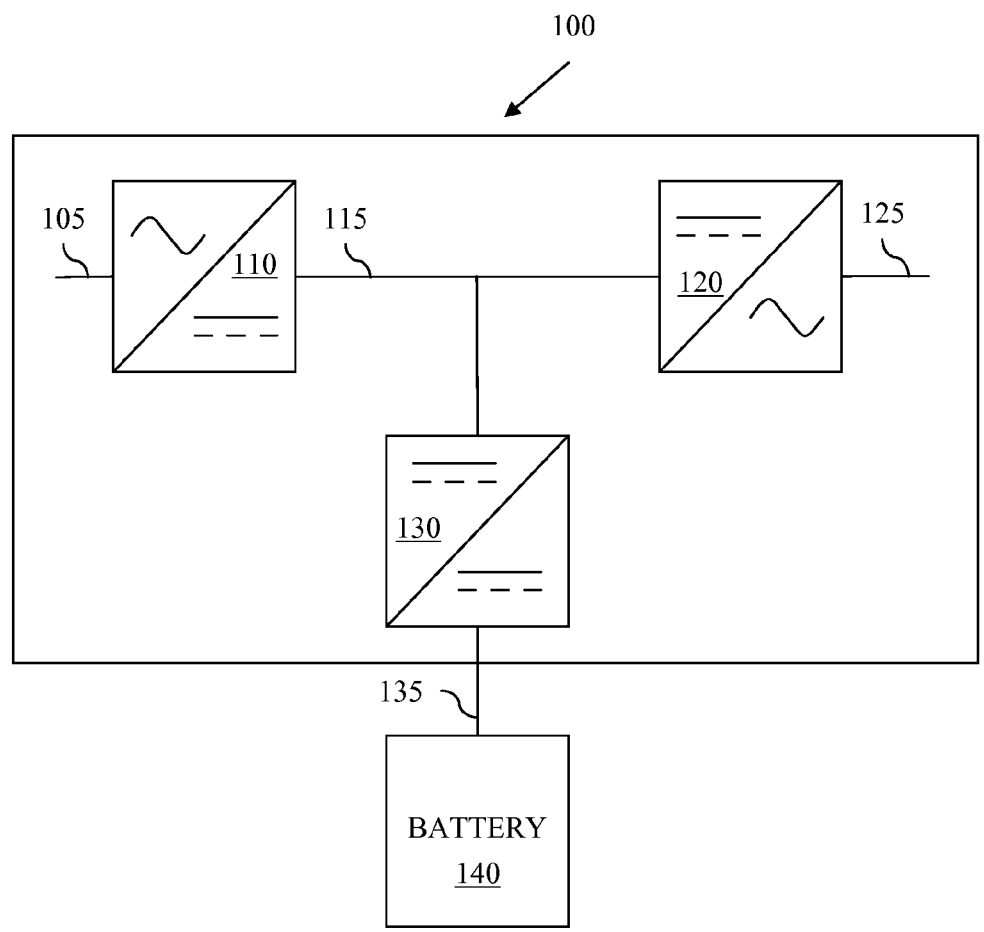
FIG. 1 illustrates a block diagram of an exemplary prior art uninterruptable power supply.
Figure 2:
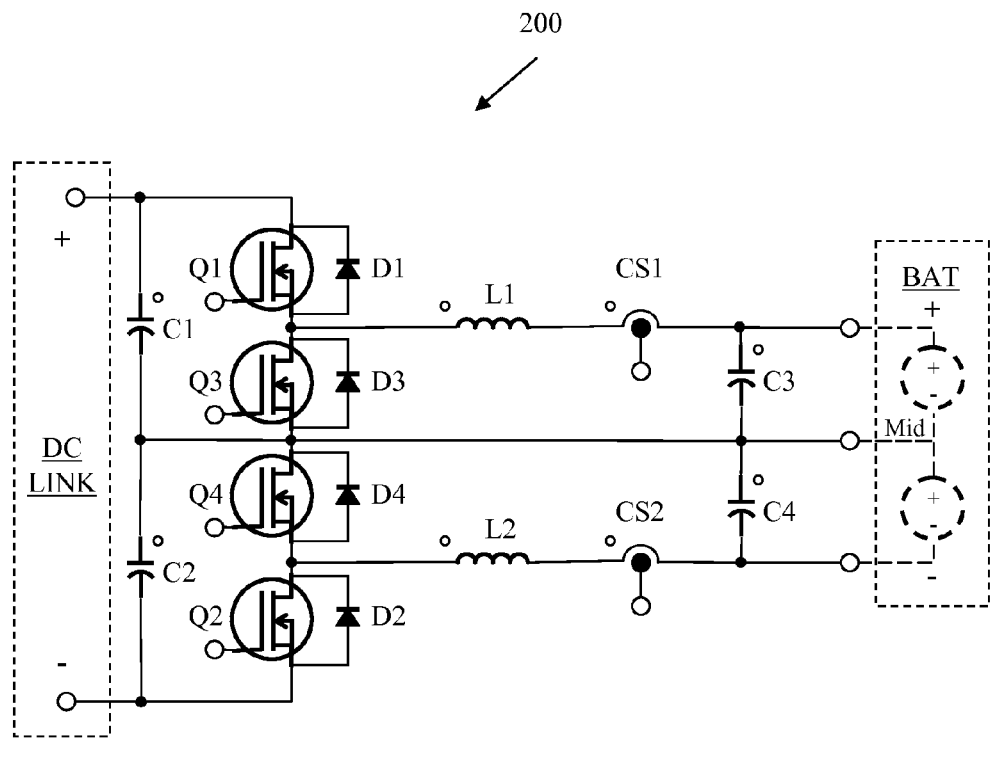
FIG. 2 illustrates a schematic of an exemplary prior art bidirectional DC-DC converter.
Figure 3:
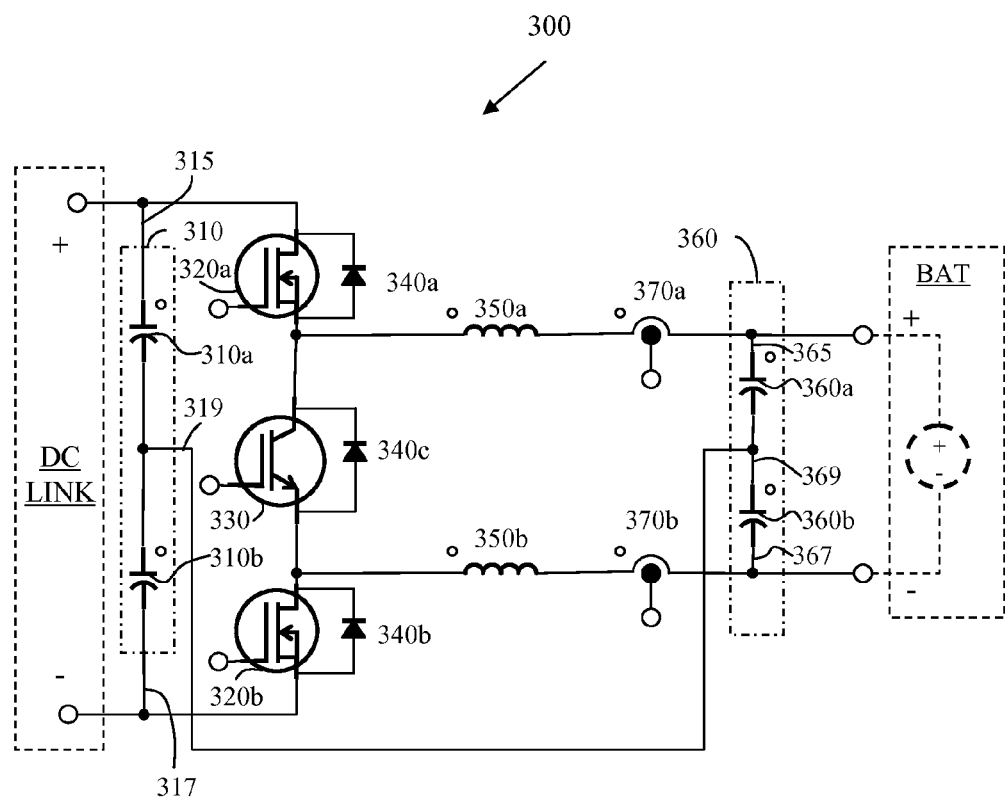
FIG. 3 illustrates a schematic diagram of an exemplary bidirectional buck-boost converter.

FIG. 3 illustrates a schematic diagram of an exemplary bidirectional buck-boost converter 300. In the illustrated embodiment, the converter 300 connects to a UPS DC link DC Link and a battery BAT. In other embodiments, the converter 300 connects between two voltages other than a UPS DC link and a battery.

The converter 300 includes a first set of capacitors 310. In the illustrated embodiment, the first set of capacitors includes two capacitors 310a-b. In other embodiments, the first set of capacitors includes a number of capacitors other than two. The first set of capacitors 310 has a positive terminal 315, a negative terminal 317, and a mid terminal 319. The positive terminal 315 connects to a positive rail +DC Link and a negative rail −DC Link of the DC Link.

The converter 300 further includes a first buck switching element 320a and a second buck switching element 320b. The first buck switching element 320a operably connects to the positive terminal 315 of the first set of capacitors 310. The second buck switching element 320b operably connects to the negative terminal 317 of the first set of capacitors 310.

The converter 300 also includes a boost switching element 330. The boost switching element 330 has one terminal operably connected to the first buck switching element 320a and a second terminal operably connected to the second buck switching element 320b.

A "switching element," as used herein in reference to, for example, buck switching elements 320a-b and boost switching element 330, refers to one or more switching devices (e.g. transistors, metal oxide substrate field effect transistor (MOSFET), insulated gate bipolar transistor (IGBT), junction field effect transistor (JFET), bipolar junction transistor (BJT), combinations thereof, and so on) that act substantially as one switching device. A "switching element," as used herein, includes but is not limited to two or more transistors connected in series (e.g. emitter to collector, source to drain, and so on) and biased by the same or substantially the same drive signal (e.g. base, gate-source, and so on). A "switching element," as used herein, also includes, but is not limited to, a single switching device.

The converter 300 includes a set of unidirectionally conducting elements such as the diodes 340a-c operably connected in antiparallel to the first buck switching element 320a, the second buck switching element 320b, and the boost switching element 330, respectively. The unidirectionally conducting elements may include, in addition to diodes, rectifiers, thyristors, and so on. In embodiments where one or more of the first buck switching element 320a, the second buck switching element 320b, and the boost switching element 330 is, for example, a MOSFET, the corresponding unidirectionally conducting element may be not a discrete device, but instead the corresponding unidirectionally conducting element may be the parasitic body diode of its corresponding MOSFET. In other embodiments, the unidirectionally conducting element may be a copackaged diode, a discrete diode, and so on.

The converter 300 further includes a first inductor 350a and a second inductor 350b. The first inductor 350a has one terminal operably connected to the first buck switching element 320a and the boost switching element 330. The second inductor 350b has one terminal operably connected to the second buck switching element 320b and the boost switching element 330. In some embodiments, the inductors 350a-b are operably connected to the buck switching elements 320a-b, respectively, and the boost switching element 330 through current sensors. In one embodiment (not shown), the converter includes one inductor. In other embodiments, the converter includes three or more inductors.

The converter 300 includes a second set of capacitors 360. In the illustrated embodiment, the second set of capacitors includes two capacitors 360a-b. In other embodiments, the second set of capacitors includes a number of capacitors other than two. The second set of capacitors has a positive terminal 365, a negative terminal 367, and a mid terminal 369.

The positive and negative terminals 365 and 367 operably connect to the first and second inductors 350a-b, respectively. In the illustrated embodiment, the positive and negative terminals 365 and 367 operably connect to the inductors 350a-b through current sensors 370a-b, respectively. In other embodiments (not shown), the positive and negative terminals 365 and 367 operably connect to the inductors 350a-b directly or through one or more devices such as shunts, current sensors, current transformers, and so on.

The positive and negative terminals 365 and 367 also operably connect to the positive and negative terminals, respectively, of the battery BAT. In some embodiments (not shown), the positive and negative terminals 365 and 367 operably connect to the battery BAT through one or more devices such as fuses, current sensors, EMI filters, shunts, switches, disconnects, connectors, relays, and so on. The mid terminal 369 of the second set of capacitors 360 operably connects to the mid terminal 319 of the second set of capacitors 310.

In the illustrated embodiment, the converter 300 also includes the first current sensor 370a and the second current sensor 370b connected in series with the inductors 350a and 350b, respectively. In some embodiments (not shown), the current sensors are connected in the circuit at locations other than those illustrated. For example, a current sensor may be connected in series with an inductor between the inductor and the buck and boost switching elements. In other embodiments, a current sensor may be connected not in series with an inductor. In one embodiment (not shown), the converter includes only one current sensor. In other embodiments (not shown), the converter includes three or more current sensors. A current sensor, for purposes of this disclosure, includes but is not limited to a shunt, a hall effect current sensor, a current transformer, and so on.

In one embodiment (not shown), a control circuit operably connects to the buck switching elements 320a-b and the boost switching element 330. The control circuit transmits drive signals to the buck switching elements 320a-b that cause the buck switching elements 320a-b to switch on and off periodically in buck mode and remain off in boost mode. The control circuit transmits signals to the boost switching element 330 that cause the boost switching element to switch on and off periodically in boost mode and to remain off in buck mode.

Figure 4:
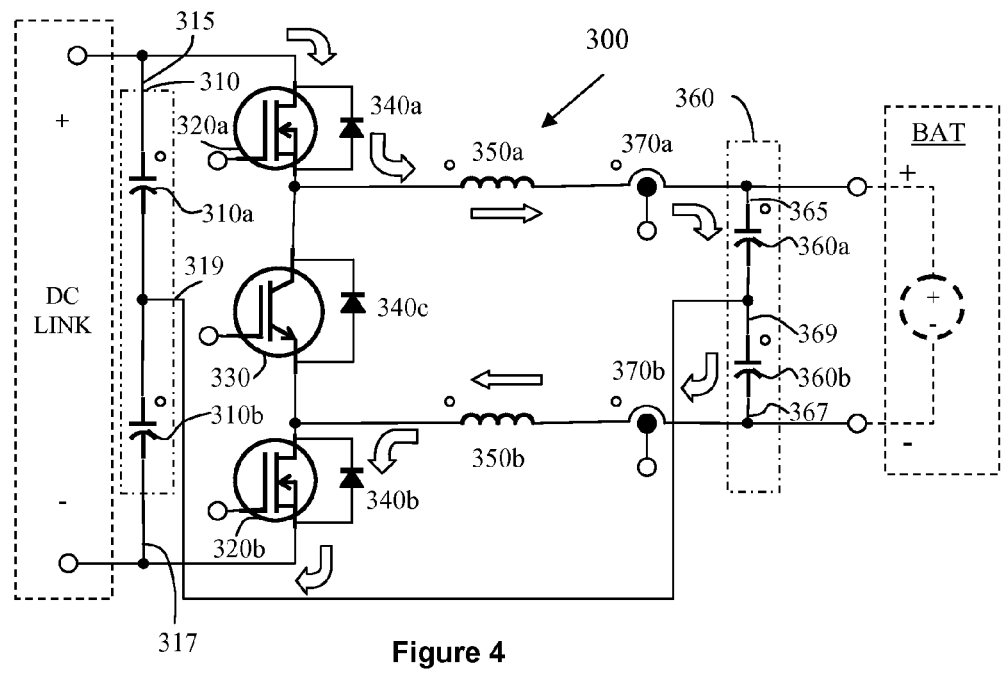
FIG. 4 illustrates a schematic diagram showing the inductor charging portion of buck mode operation of the exemplary buck-boost bidirectional converter.
Figure 5:
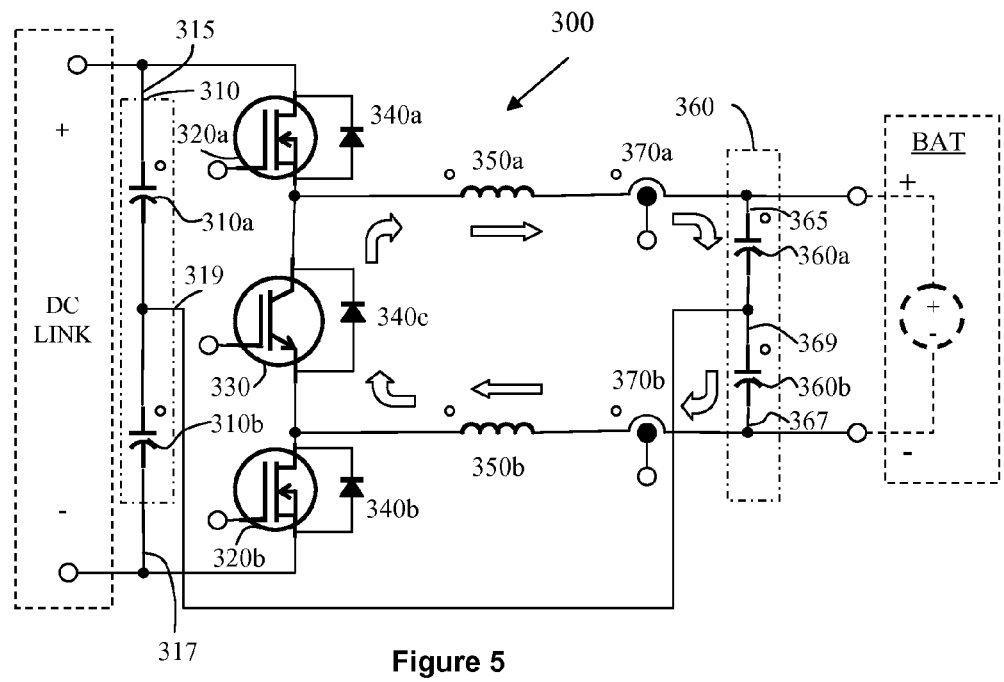
FIG. 5 illustrates a schematic diagram showing the inductor discharging portion of buck mode operation of the exemplary buck-boost bidirectional converter.

FIGS. 4 and 5 illustrate schematic diagrams showing buck mode operation of the exemplary buck-boost bidirectional converter 300. In buck mode, the buck switching elements 320a-b switch on and off periodically while the boost switching element 330 remains off. FIG. 4 illustrates the inductor charging portion of the buck mode cycle and FIG. 5 illustrates the inductor discharging portion of the buck mode cycle.

In reference to FIG. 4, the first and second buck switching elements 320a-b are switched on during the inductor charging portion of the buck mode cycle. Current flows from the DC Link through the first buck switching element 320a, through the first inductor 350a, to the battery BAT, and back through the second inductor 350b, and through the second buck switching element 320b. During this half of the buck mode cycle, current in the first and second inductors 350a and 350b ramp up.

In reference to FIG. 5, during the inductor discharging portion of the buck mode cycle, the first and second buck switching elements 320a-b are switched off. Current stops flowing through the first and second buck switching elements 320a-b. The diode 340c becomes forward biased. Current flows out of the second inductor 350b, through the diode 340c, through and out of the first inductor 350a, and back. During this half of the buck mode cycle, current in the first and second inductors 350a and 350b ramps down.

The first set of capacitors 310 may smooth out the voltage input from the DC Link. The second set of capacitors 360a-b together with the inductors 350a-b contributes in filtering out some of the ripple voltage from the output voltage to the battery BAT.

Figure 6:
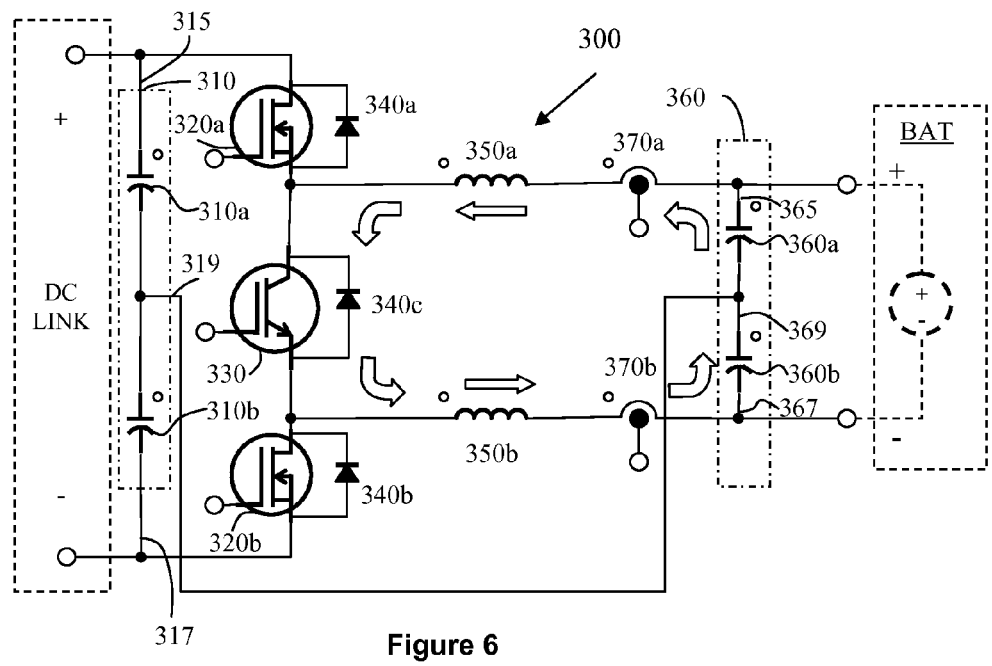
FIG. 6 illustrates a schematic diagram showing the inductor charging portion of boost mode operation of the exemplary buck-boost bidirectional converter.
Figure 7:
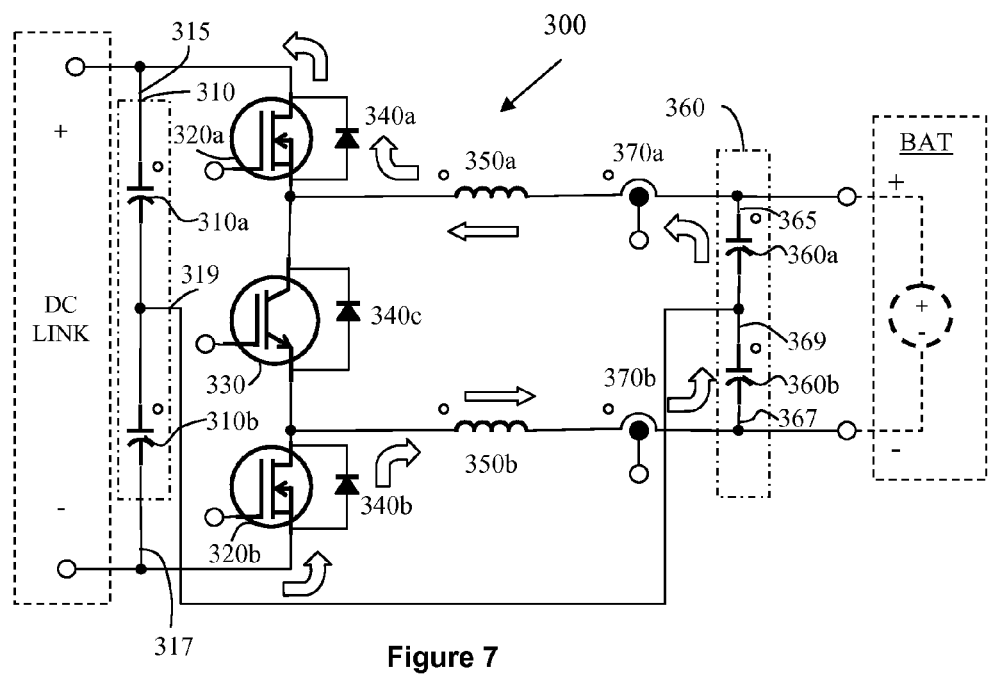
FIG. 7 illustrates a schematic diagram showing the inductor discharging portion of boost mode operation of the exemplary buck-boost bidirectional converter.

FIGS. 6 and 7 illustrate schematic diagrams showing boost mode operation of the exemplary buck-boost bidirectional converter 300. In boost mode, the buck switching elements 320a-b remain off while the boost switching element 330 switches on and off periodically. FIG. 6 illustrates the inductor charging portion of the boost mode cycle and FIG. 7 illustrates the inductor discharging portion of the boost mode cycle.

In reference to FIG. 6, the boost switching element 330 is switched on during the inductor charging portion of the boost mode cycle. Current flows from the battery BAT, through the first inductor 350a, through the boost switching element 330, and back through the second inductor 350b. During this half of the boost mode cycle, current in the first and second inductors 350a and 350b ramps up.

In reference to FIG. 7, the boost switching element 330 is switched off during the inductor discharging portion of the boost mode cycle. Current stops flowing through the boost switching element 330. The diodes 340a and 340b become forward biased. Current flows through the diode 340a to the DC Link, and back trough the diode 340b. During this half of the buck mode cycle, current in the first and second inductors 350a and 350b ramps down.

The second set of capacitors 360 may smooth out the voltage input from the battery BAT. The first set of capacitors 310 in combination with the inductors 350a-b contributes in filtering out some of the ripple voltage from the output voltage to the DC Link.

Two or more converters such as the converter 300 may be connected in parallel such that they share a common battery.

Figure 8A:
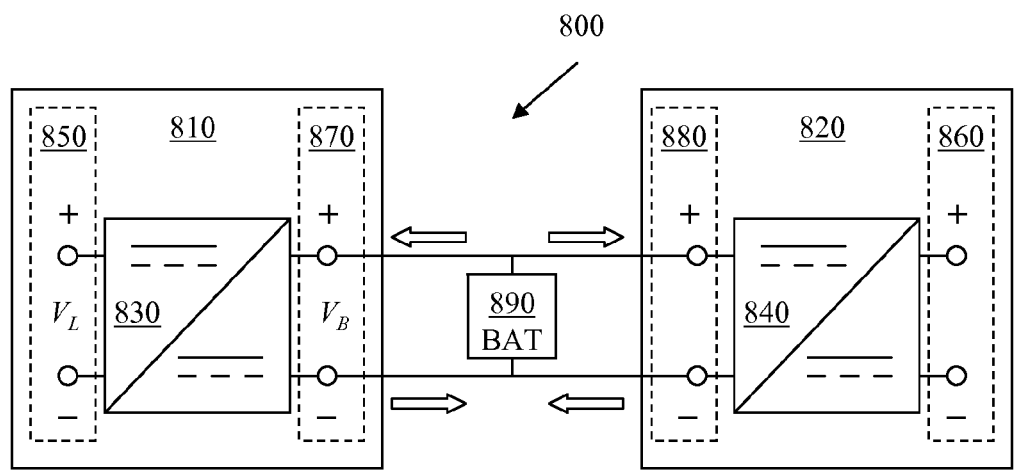
FIG. 8A illustrates a block diagram of an exemplary system including two uninterruptable power supplies including buck-boost bidirectional converters.

FIG. 8A illustrates a exemplary system 800 including two UPS 810 and 820. Each of the UPS 810 and 820 include bidirectional buck/boost DC/DC converters 830 and 840 as described above. The converters 830 and 840 each includes a DC Link port, 850 and 860 respectively, that is operably coupled to the DC Link of its respective UPS. The converters 830 and 840 further include battery ports 870 and 880, respectively, that operably connect to a battery 890. The converters 830 and 840 connect in parallel to the common battery 890.

Figure 8B:
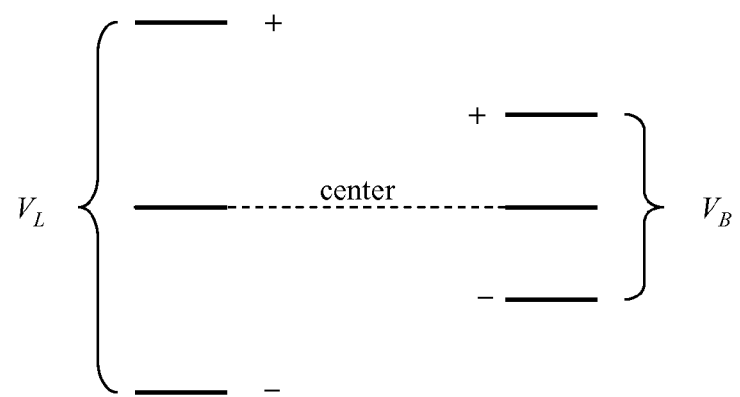
FIG. 8B illustrates an exemplary chart depicting the battery voltage across the battery port and the DC link voltage across the DC link port of a buck-boost bidirectional converter during boost mode operation of the converter.

FIG. 8B illustrates the battery voltage $V_B$ across the battery port 870 and the DC link voltage $V_L$ across the DC link port 850 during boost mode operation of the converter 830. At least in boost mode, the converter 830 operates such that the battery voltage $V_B$ is substantially centered between the DC link voltage $V_L$. The converter 840 has a similar operation. Therefore, at least in boost mode, voltage centering or balancing of the DC links 850 and 860 relative to the battery 890 happens automatically, without the need for additional circuitry for active balancing or centering. Substantially no current flows from the converter 830 to the converter 840 or vice versa. Substantially no current circulates among the parallel connected converters 830 and 840 or UPS 810 and 820. At least in part for these reasons, control of the converters is relatively simple in comparison to prior art bidirectional buck-boost converter circuit configurations.

An "operable connection," or a connection by which components are "operably connected," is one by which the operably connected components or the operable connection perform its intended purpose. For example, two components may be operably connected to each other directly or through one or more intermediate components. An "operable connection" includes connections through devices such as fuses, current sensors, shunts, and so on that have none or negligible effect on current flowing through the devices. In another example, two components can be operably connected by being able to communicate signals to each other directly or through one or more intermediate components such as a conductor, a wire, a processor, a logic, or other component.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

While the present disclosure illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details and illustrative examples shown or described. Accordingly, departures may be made from such details without departing from the spirit or scope of the claimed invention. Moreover, the foregoing embodiments are illustrative, and no single feature or element is essential to all possible combinations that may be claimed in this or a later application.

What is claimed is:

1. A bidirectional buck-boost converter comprising:
a first set of capacitors, where the first set of capacitors has positive, negative, and mid terminals, and where the positive and negative terminals of the first set of capacitors are configured to operably connect to positive and negative rails, respectively, of a first source;
a second set of capacitors, where the second set of capacitors has positive, negative, and mid terminals, where the positive and negative terminals of the second set of capacitors are configured to operably connect to positive and negative terminals, respectively, of a second source, and where the mid terminal of the first set of capacitors is operably connected to the mid terminal of the second set of capacitors;
a set of buck switching elements including a first buck switching element and a second buck switching element and configured to switch on and off periodically in buck mode and configured to remain off in boost mode, where the first buck switching element is operably connected to the positive terminal of the first set of capacitors and the second buck switching element is operably connected to the negative terminal of the first set of capacitors;
a set of inductors including a first inductor and a second inductor, where the first inductor has one terminal operably connected to the positive terminal of the second set of capacitors and another terminal operably connected to the first buck switching element, and where the second inductor has one terminal operably connected to the negative terminal of the second set of capacitors and another terminal operably connected to the second buck switching element;
a boost switching element configured to switch on and off periodically in boost mode and to remain off in buck mode and having one terminal operably connected to the first buck switching element and the first inductor, and a second terminal operably connected to the second buck switching element and the second inductor;
a set of unidirectionally conducting elements including first, second, and third unidirectionally conducting elements operably connected in antiparallel to the first buck switching element, the second buck switching element, and the boost switching element, respectively; and
at least one current sensor configured to sense current through at least one of the first inductor and the second inductor.

2. The bidirectional buck-boost converter of claim 1, where the at least one current sensor includes a first current sensor operably connected in series with the first inductor and a second current sensor operably connected in series with the second inductor.

3. The bidirectional buck-boost converter of claim 1, where the boost switching element comprises a single switching device.

4. The bidirectional buck-boost converter of claim 1, further comprising:
a control circuit operably connected to the buck switching elements and the boost switching element, where the control circuit is configured to transmit signals to the buck switching elements and to the boost switching element, where the signals cause the buck switching elements to switch on and off periodically in buck mode and remain off in boost mode, and where the signals cause the boost switching element to switch on and off periodically in boost mode and to remain off in buck mode.

5. The bidirectional buck-boost converter of claim 1, where the first source is a DC link of an uninterruptable power supply (UPS) and the second source is a battery.

6. The bidirectional buck-boost converter of claim 5, where the battery is common to the UPS and at least a second UPS.

7. The bidirectional buck-boost converter of claim 6, where, at least in boost mode, no current circulates from the UPS to the second UPS.

8. An uninterruptable power supply (UPS) including a bidirectional buck-boost converter, the converter comprising:
first and second terminals configured to connect to a first voltage source;
third and fourth terminals configured to connect to a second voltage source;
a first switching element operably connected to the first terminal;
a second switching element operably connected to the second terminal;
a third switching element operably connected between the first and second switching elements;
first, second, and third diodes operably connected in antiparallel to the first, second, and third switching elements respectively;
a first inductor with one end operably connected to the first switching element and the third switching element;
a first capacitor operably connected to the first terminal;
a second capacitor operably connected to the second terminal and to the first capacitor;
a third capacitor operably connected to the third terminal, the first capacitor, and the second capacitor; and
a fourth capacitor operably connected to the fourth terminal, the first capacitor, the second capacitor, and the third capacitor.

9. The UPS of claim 8, further comprising:
at least one current sensor configured to sense inductor current.

10. The UPS of claim 8, further comprising:
a second inductor with one end operably connected to the second switching element and the third switching element.

11. The UPS of claim 10, further comprising:
a first current sensor connected in series with the first inductor; and
a second current sensor connected in series with the second inductor.

12. The UPS of claim 8, where the third switching element consists of a single switching device.

13. The UPS of claim 8, further comprising:
a control circuit configured to transmit signals to the first, second, and third switching elements to cause the first and second switching elements to switch on and off periodically in buck mode and the third switching element to switch on and off periodically in boost mode.

14. The UPS of claim 8, where the second voltage source is a battery, and where the UPS is configured to connect in parallel with at least one additional UPS to the battery with substantially no current flowing between the UPS and the at least one additional UPS in boost mode operation of the bidirectional buck-boost converter.

15. A UPS including a DC-DC converter configured to operate in buck mode and in boost mode, the DC-DC converter comprising:
a first switching element operably connected to a first terminal of a first voltage source;
a second switching element operably connected to a second terminal of the first voltage source;
a third switching element operably connected to the first and second switching elements;
first, second, and third unidirectionally conducting elements operably connected in antiparallel to the first, second, and third switching elements respectively;
a first inductor having one end operably connected to the first switching element and the third switching element and another end operably connected to a first terminal of a second voltage source;
a first set of capacitors, where the first set of capacitors has positive, negative, and mid terminals, and where the positive and negative terminals of the first set of capacitors are operably connected to the first terminal and the second terminal, respectively, of the first voltage source;
a second set of capacitors, where the second set of capacitors has positive, negative, and mid terminals, where the positive and negative terminals of the second set of capacitors are operably connected to the first terminal and a second terminal, respectively, of the second voltage source, and where the mid terminal of the first set of capacitors is operably connected to the mid terminal of the second set of capacitors; and
a control circuit operably connected to the first, second, and third switching elements, where in the buck mode the control circuit outputs a first control signal that periodically turns on and off the first and second switching elements and a second control signal that keeps the third switching element off, and where in the boost mode the control circuit outputs a second control signal that periodically turns on and off the third switching element and keeps the first and second switching elements off.

16. The UPS of claim 15, further comprising:
at least one current sensor configured to sense inductor current.

17. The UPS of claim 15, further comprising:
a second inductor having one end operably connected to the second switching element and the third switching element and another end operably connected to the second terminal of the second voltage source.

18. The UPS of claim 17, further comprising:
a first current sensor connected in series with the first inductor; and
a second current sensor connected in series with the second inductor.

19. The UPS of claim 15, where the second voltage source is a battery common to the UPS and a second UPS, and where substantially no current flows from the UPS to the second UPS in boost mode operation of the DC-DC converter.

20. The UPS of claim 15, where the third switching element consists of a single switching device selected from the group consisting of:
a bipolar transistor;
a field effect transistor (FET); and
an insulated gate bipolar transistor (IGBT).

21. An uninterruptable power supply (UPS) comprising:
a DC link port operably coupled to a DC link of the UPS;

a battery port configured to operably couple to at least one battery; and a DC/DC converter operably coupled to the DC link port and to the battery port and configured to transfer power from the DC link port to the battery port in buck mode and to transfer power from the battery port to the DC link port in boost mode, where the DC/DC converter is operable such that in boost mode a battery voltage across the battery port is substantially centered between a DC link voltage across the DC link automatically without active voltage centering.

22. The UPS of claim 21, where the DC/DC converter includes a single boost switching element.

23. The UPS of claim 21, where the UPS is configured to connect to the at least one battery in parallel with at least a second UPS and where, at least in boost mode, substantially no current flows from the UPS to the second UPS.

24. A method for operation of a bidirectional DC/DC converter operably coupled to a DC link and to a battery, the method comprising:

switching from a buck mode of operation where the bidirectional DC/DC converter transfers power from the DC link to the battery to a boost mode of operation where the bidirectional DC/DC converter transfers power from the battery to the DC link; and operating a single boost switching element such that amplitude of a voltage across the battery is substantially centered between amplitude of a voltage across the DC link.

25. The method of claim 24, wherein at least one additional bidirectional DC/DC converter is operably connected to the battery in parallel with the bidirectional DC/DC converter, and wherein the operating includes operating the single boost switching element such that substantially no current from the bidirectional DC/DC converter flows to the at least one additional bidirectional DC/DC converter.

* * * * *